(12) United States Patent
Hassdenteufel et al.

(10) Patent No.: US 8,371,407 B2
(45) Date of Patent: Feb. 12, 2013

(54) FRONT-END MODULE FOR VEHICLES

(75) Inventors: Klaus Hassdenteufel, Gerlingen (DE);
Markus Hoeglinger, Stuttgart (DE);
Guido Opperbeck, Lippstadt (DE); Ralf Schoening, Herzebrock-Clarholz (DE)

(73) Assignees: HBPO GmbH, Lippstadt (DE); Behr GmbH & Co. KG, Stuttgart (DE)

( * ) Notice: Subject to any disclaimer, the term of this patent is extended or adjusted under 35 U.S.C. 154(b) by 929 days.

(21) Appl. No.: 12/216,925

(22) Filed: Jul. 11, 2008

(65) Prior Publication Data

US 2009/0039674 A1 Feb. 12, 2009

(30) Foreign Application Priority Data

Jul. 13, 2007 (DE) .......................... 10 2007 033 116

(51) Int. Cl.
*B60K 11/04* (2006.01)
*F28D 21/00* (2006.01)

(52) U.S. Cl. ...................... 180/68.4; 165/149

(58) Field of Classification Search ................. 180/68.1, 180/68.4, 68.6; 280/781, 785; 296/203.02
See application file for complete search history.

(56) References Cited

U.S. PATENT DOCUMENTS

| | | | | |
|---|---|---|---|---|
| 2,095,058 | A * | 10/1937 | Cross | 180/294 |
| 3,762,489 | A * | 10/1973 | Proksch et al. | 180/68.1 |
| 3,980,132 | A * | 9/1976 | Mitchell et al. | 165/76 |
| 5,915,490 | A * | 6/1999 | Wurfel | 180/68.1 |
| 6,105,660 | A * | 8/2000 | Knurr | 165/41 |
| 6,382,312 | B2 * | 5/2002 | Avequin et al. | 165/140 |
| 6,405,819 | B1 * | 6/2002 | Ohkura et al. | 180/68.1 |
| 6,557,627 | B2 * | 5/2003 | Moltzheim et al. | 165/121 |
| 6,622,808 | B2 * | 9/2003 | Sasano et al. | 180/68.3 |
| 6,973,984 | B2 | 12/2005 | Cheron et al. | |
| 7,455,100 | B2 * | 11/2008 | Tallon | 165/41 |
| 2006/0033364 | A1 * | 2/2006 | Lee | 296/203.02 |
| 2006/0102109 | A1 | 5/2006 | Becker et al. | |
| 2007/0119564 | A1 * | 5/2007 | Contet | 165/67 |

FOREIGN PATENT DOCUMENTS

| | | |
|---|---|---|
| DE | 198 31 256 | 1/2000 |
| DE | 100 48 245 A1 | 4/2002 |
| DE | 102 48 440 A1 | 5/2004 |
| DE | 10 2005 009 768 A1 | 9/2006 |
| EP | 1352810 A2 | 10/2003 |
| FR | 2 758 121 A | 8/1997 |
| WO | WO-99/54187 A1 | 10/1999 |

* cited by examiner

*Primary Examiner* — J. Allen Shriver, II
*Assistant Examiner* — Bridget Avery
(74) *Attorney, Agent, or Firm* — Birch, Stewart, Kolasch & Birch, LLP

(57) ABSTRACT

A front-end module for vehicles which comprises a mounting member with a plurality of sections extending in different directions to accommodate vehicle components wherein a component provided as a cooling module is by means of fixing elements secured to said mounting member in a central area thereof and wherein an air guide unit is disposed adjacent to said mounting member which unit comprises at least one air guide element made of a foamed material.

17 Claims, 8 Drawing Sheets

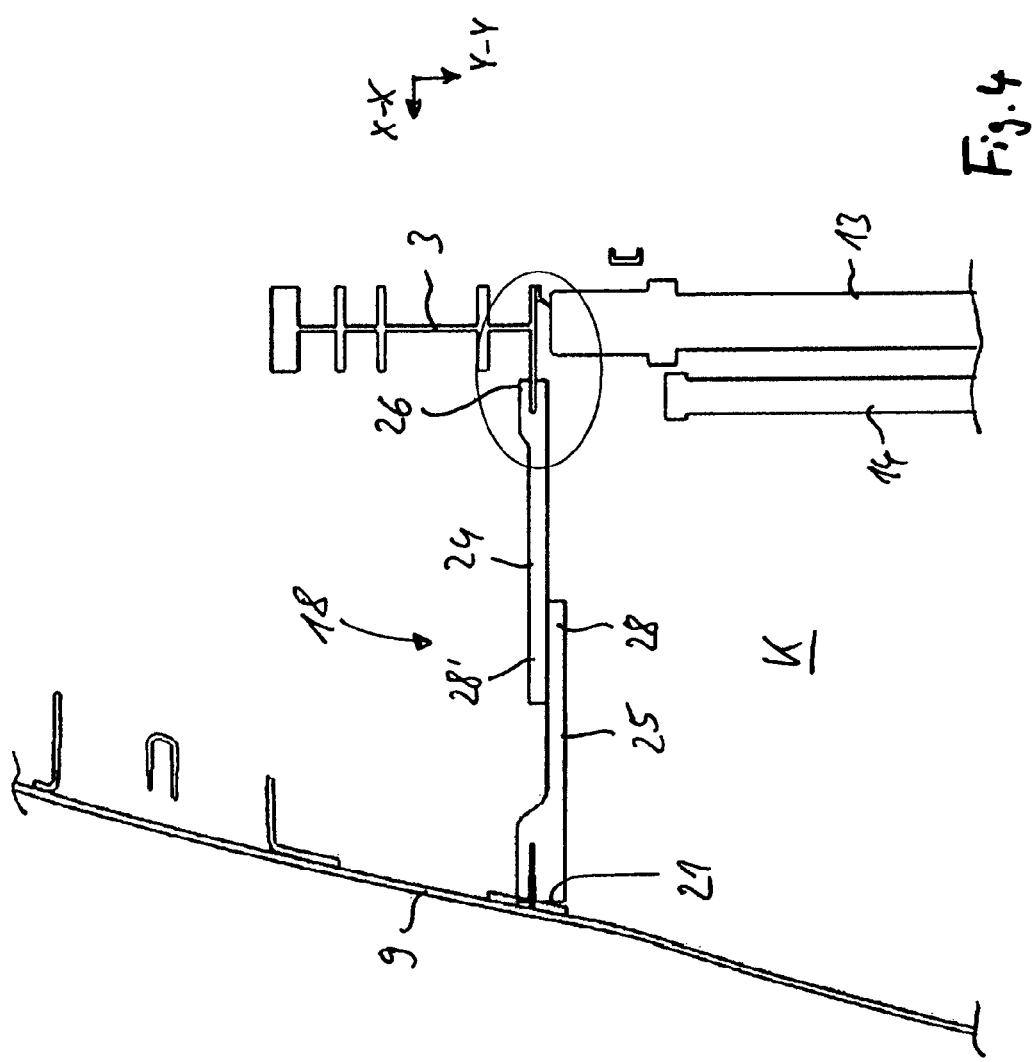

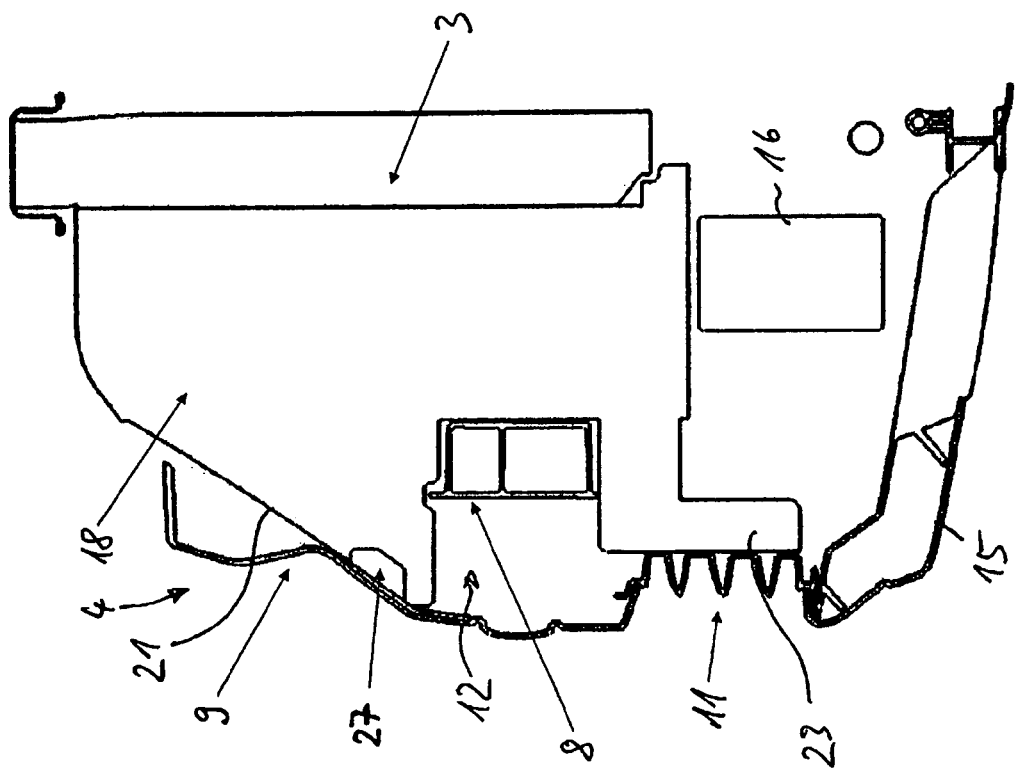

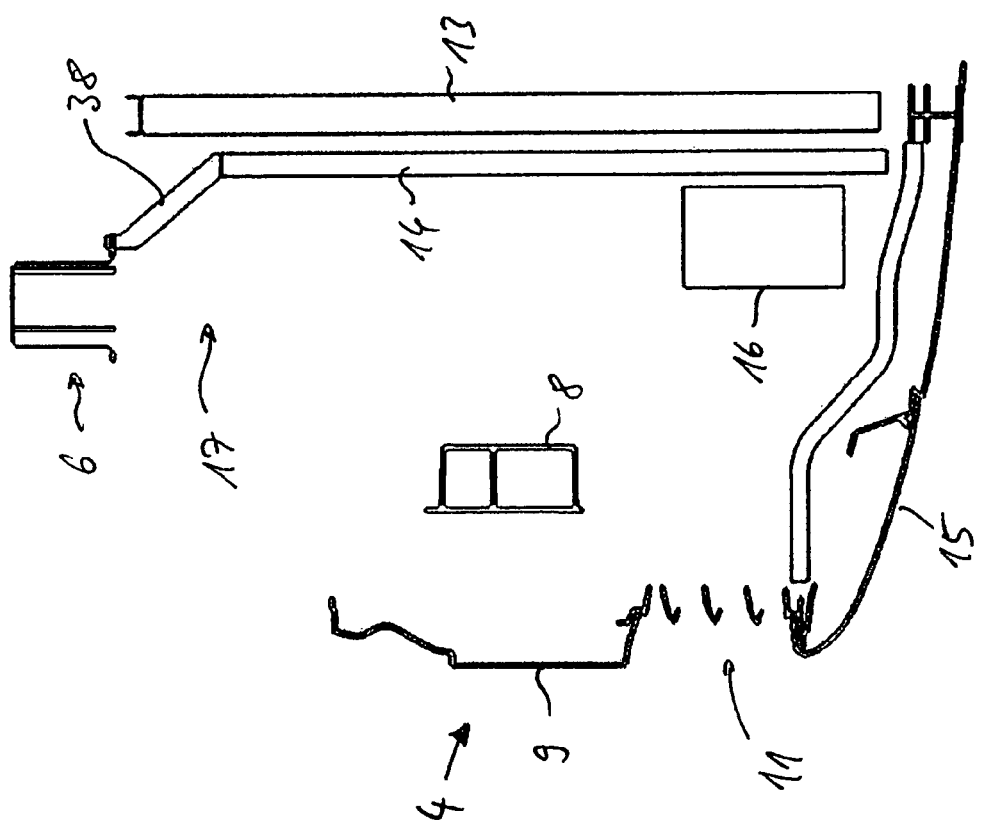

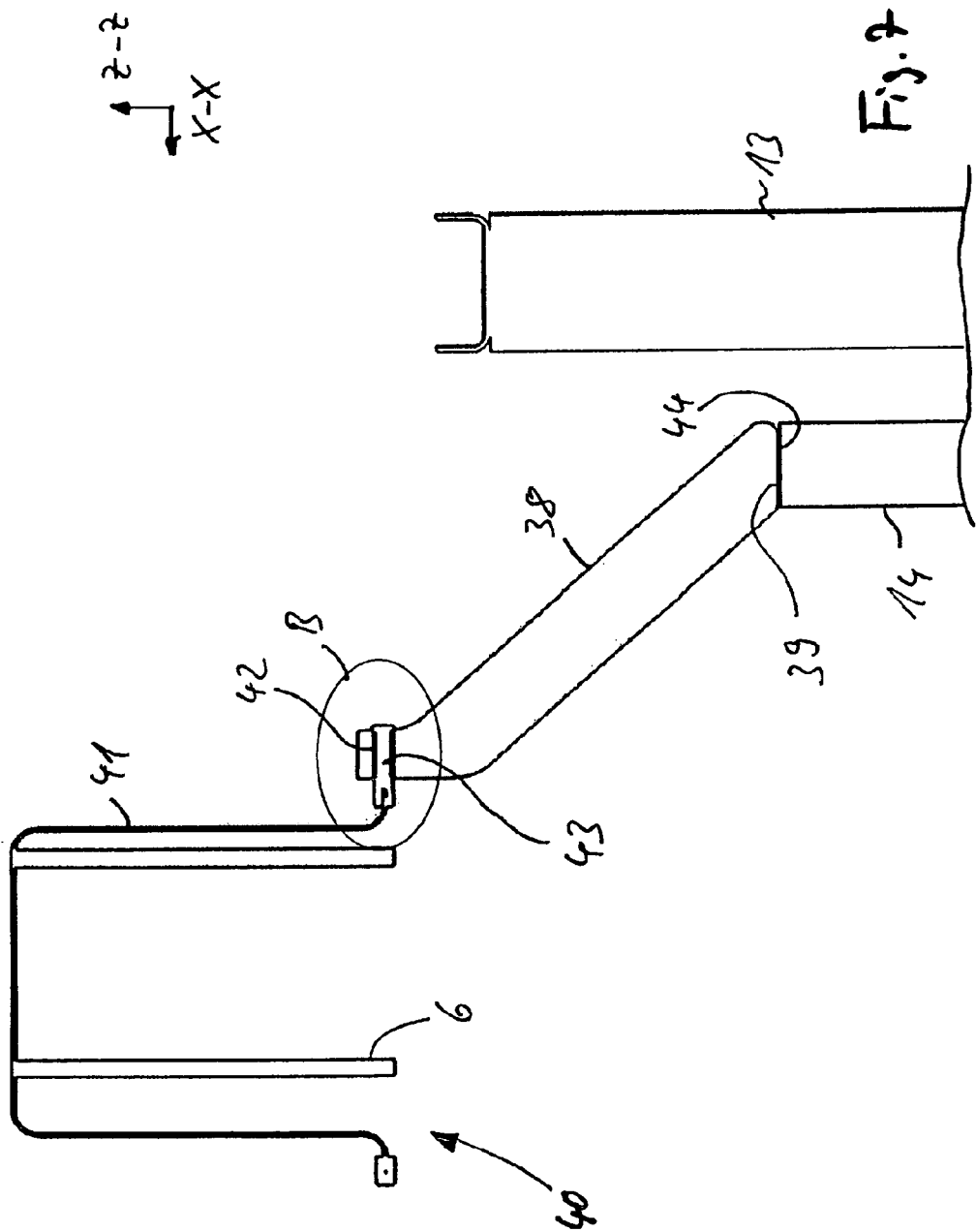

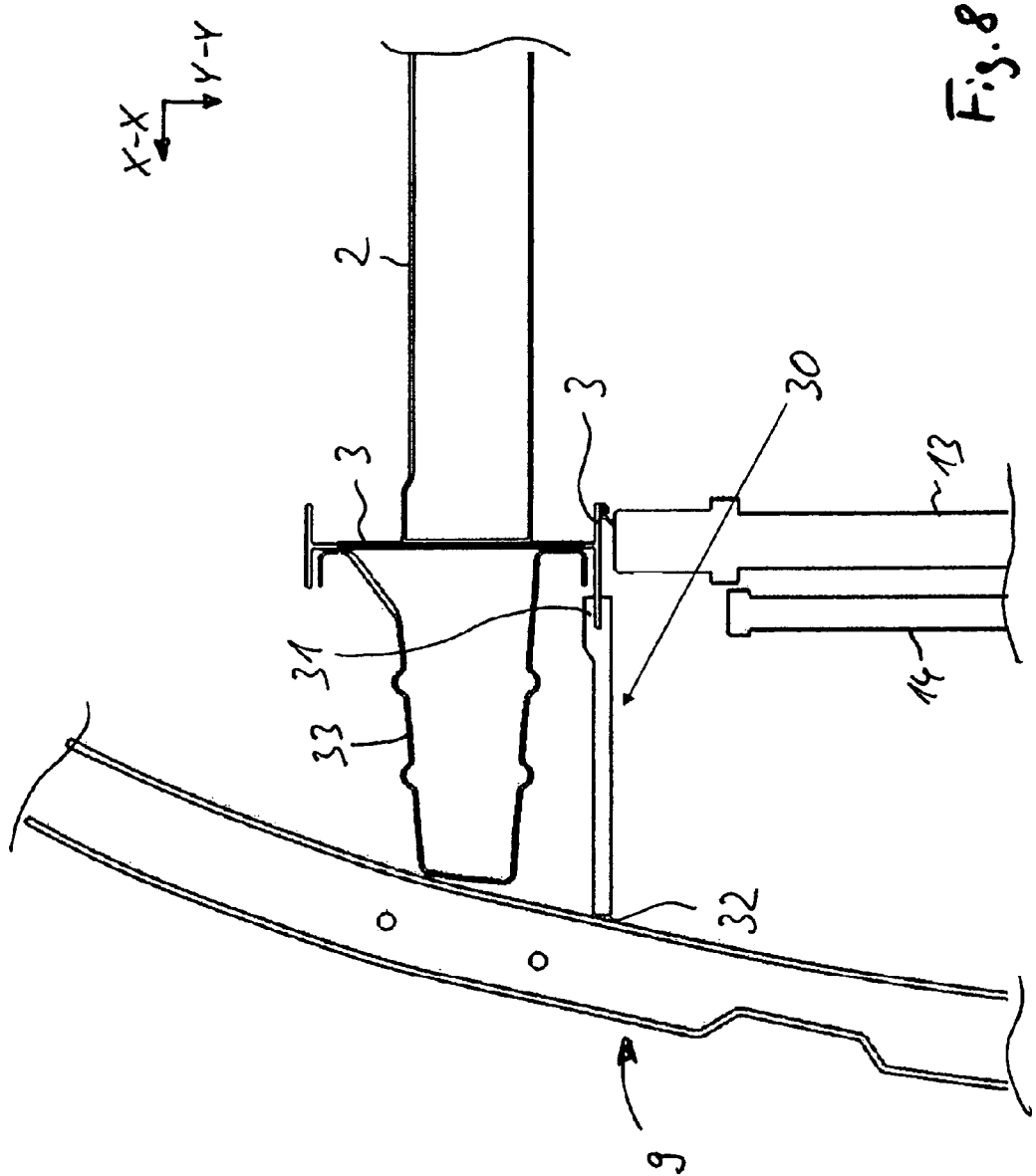

FRONT-END MODULE FOR VEHICLES

BACKGROUND OF THE INVENTION

This present invention relates to a front-end module for vehicles which comprises a mounting member with a plurality of sections extending in different directions to accommodate vehicle components wherein a component provided as a cooling module is by means of fixing elements secured to said mounting member in a central area thereof and wherein an air guide unit is disposed adjacent to said mounting member.

Prior known from DE 102 48 440 A1 is an attachment unit for a vehicle front end which is hung up from projections formed on a cooling module by means of lugs. The attachment unit has a plurality of breakthroughs forming fresh air channels between the front-end radiator grille and openings in the bumper cover on the one hand and the cooling module on the other hand. This prior known attachment unit is affected by the drawback that it needs to be adapted to the configuration of the cooling module and/or the front-end components of the vehicle to ensure reliable sealing of said cooling module against adjacent components (ambience sealing).

DE 10 2005 009 768 A1 is disclosing a front-end module for vehicles which comprises a mounting member to which an air guide unit extends. Said air guide unit is provided in form of an air guide box secured to a supporting cross member of a bumper unit. The air box has an all-round frame whose rear face is seated against a surface of the mounting member of the front-end module. Adaptation to the configuration of the vehicle front end is therefore necessary.

Prior known from U.S. Pat. No. 6,973,984 B2 is a front-end module for vehicles with a mounting member which is adapted for mounting to Body shell faces of a vehicle in the front-end area thereof and which serves to accommodate vehicle components such as for instance a cooling module. The cooling module is attached to the mounting member in the central area thereof. An air guide unit directly adjoins the mounting member to seal off the cooling module. The air guide unit comprises air guide elements which extend downward from a cross brace of said mounting member substantially in vertical direction and which are of adequate rigidity to withstand the force exerted by the engine cover. These air guide elements are not suitable for guiding air from a bumper unit to the cooling module.

SUMMARY OF THE INVENTION

It is an object of this present invention to improve a front-end module for vehicles in such a way that air may be efficiently carried from an ambience of the vehicle toward a cooling module disposed in the vehicle front end at low cost.

To achieve this object this present invention is characterized by the fact in conjunction with the preamble of claim 1 that the air guide unit comprises at least one air guide element made of a foamed material.

The particular advantage of this present invention resides in that by providing an air guide unit in the form of at least one air guide element made of a foamed material it is possible to reduce production costs on the one hand and the weight of the unit on the other. It is especially due to said weight reduction that the efficiency of the vehicle engine in terms of $CO_2$ emission is improved.

In one preferred embodiment of this present invention there are air guide elements of an air guide unit provided to form an air channel substantially between air inlets in the vehicle front end and a cooling module fitted to the mounting member. The air guide elements are hence forming relatively large channel walls and permit to reduce weight to a relatively great extent.

A modification of this present invention provides for air guide elements of the air guide unit to be positively connected to the mounting member. Advantageously, said air guide elements may be simply pre-assembled on the mounting member such that their final positions relative to said support will be predetermined while on final mounting of the front-end module to the vehicle a side of the air guide element that is facing away from the mounting member may be seated on a nearby component such as a heat exchanger of the cooling module or on the inner face of the bumper or as well be positively connected thereto. It is an advantage that installation of the air guide unit can be facilitated this way.

Since the air guide elements of this present invention are made of a foamed material they are featuring elasticity and thereby ensure a sealing contact with adjacent vehicle components. Sealing efficiency may be achieved this way. Also in case of positive connection of the air guide element to adjacent components will the flexibility of the air guide element make installation work easier.

Another preferred embodiment of this present invention provides for the air guide unit to have lateral air guide elements which extend substantially in vertical direction between an extension plane of the cooling module and/or the mounting member on the one hand and an extension plane of the bumper unit on the other hand. This ensures a controlled transport of fresh air from the ambience toward the cooling module. It is due to the flexibility of the air guide element material that machining tolerances of the bumper unit relative to the mounting member and/or cooling module may be compensated.

The configuration of the air guide elements made of a foamed material may be such that fixing can be done in a variety of fixing modes. The air guide element may for instance be connected to an adjacent component by pressing, clamping, buttoning or plugging.

A further preferred embodiment of this present invention relates to a lateral air guide element for an air guide unit which is segmented into a rear air guide segment and a forward air guide segment with each of said segments being positively connected to the mounting member and/or a cover of the bumper unit. The rear air guide segment and the forward air guide segment are arranged to form a tight air channel wall in that the facing longitudinal sides thereof are mated. It is an advantage also that fixing means for securing the rear air guide segment to the forward one may be omitted.

A modification of this present invention resides in that the lateral air guide element is connected to the bumper cover and/or to the mounting member by means of tongue and groove. An alternative approach would be to connect the air guide element to an adjacent component by pressing, clamping, buttoning or plugging.

According to another modification of the invention the air guide unit comprises an inclined air guide element which extends between a crossbrace of the mounting member and the top of a cooling module heat exchanger. An end area of said inclined air guide element on the side facing the mounting member may be provided with a through hole for positive engagement of a laterally protruding fixing mandrel of the mounting member. This advantageously permits the inclined air guide element to be simply attached to the mounting member.

The inclined air guide element is advantageously formed in such a way that a lower narrow side thereof comes to contact an upper narrow side of a cooling module heat exchanger. The inclined air guide element hence enables sealing of the ambience of the cooling module on top of said latter.

Further advantages of the invention are as defined in the sub-claims.

BRIEF DESCRIPTION OF THE DRAWINGS

Exemplary embodiments of this present invention will now be described with reference to the drawings in which:

FIG. 4 is an enlarged representation of a detail X from FIG. 3;

FIG. 5 is a vertical section through a front-end portion of the vehicle as shown in FIG. 1 in the area of a lateral air guide element;

FIG. 6 is a vertical section through a front-end portion of the vehicle shown in FIG. 1 in the center of the front-end module in which the cooling module is disposed and in which an inclined air guide element of the air guide unit extends between a crossbrace of the mounting member and the top of the cooling module;

FIG. 7 is an enlarged representation showing the type of attachment of the inclined air guide element shown in FIG. 6; and FIG. 8 is a partial horizontal section through a front-end portion of the vehicle in the marginal area of the cooling module in which a one-piece air guide element extends between mounting member and bumper cover.

DETAILED DESCRIPTION OF THE INVENTION

Figure 1:
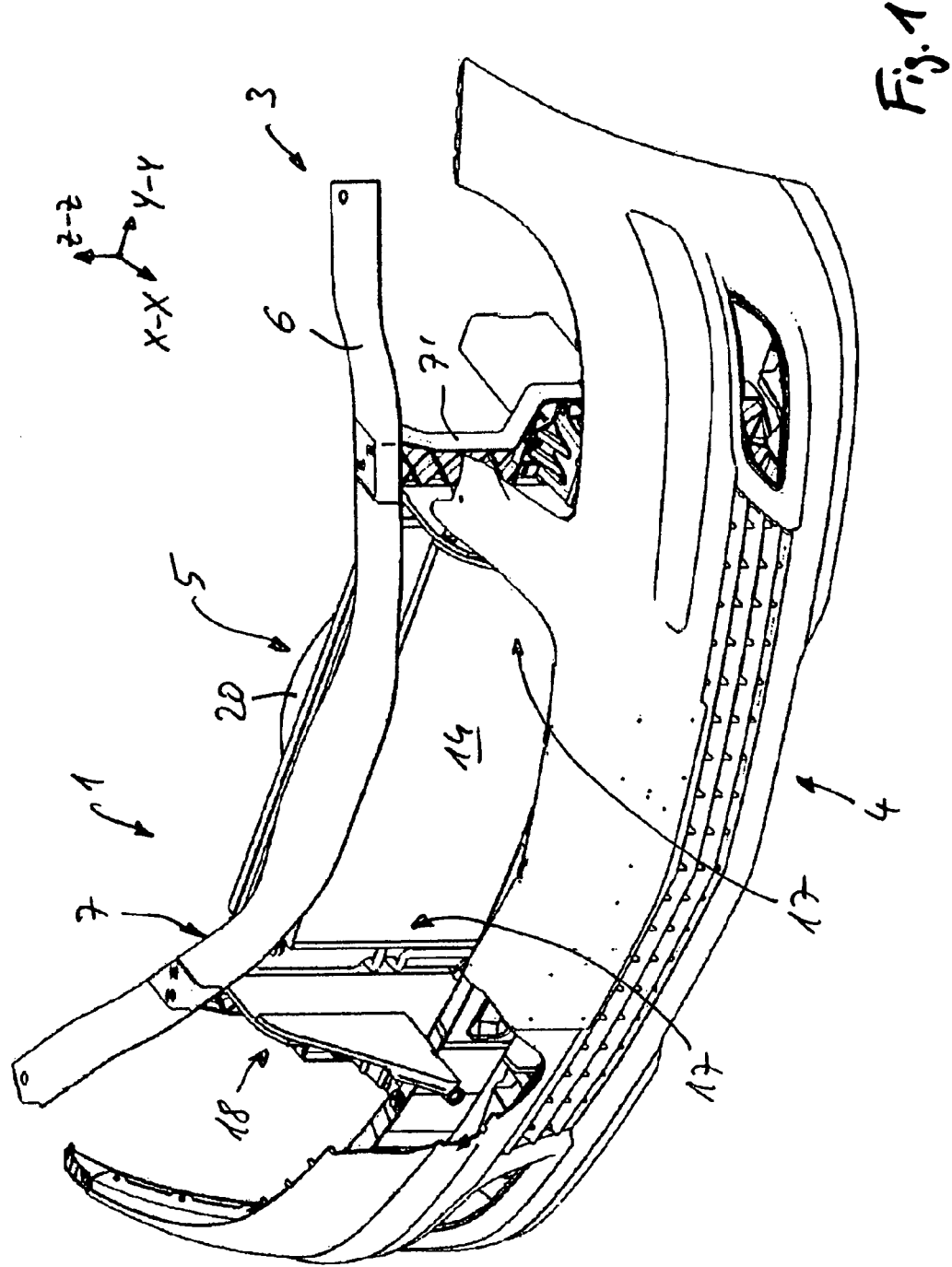
FIG. 1 is a perspective front view of a front-end module comprising a mounting member to which a cooling module and a bumper unit are attached.

A front-end module 1 for vehicles is secured to a structural component such as a longitudinal member 2 of the body shell with the aid of suitable fixing means in the front end of a vehicle (FIG. 8). The front-end module 1 extends substantially across the entire width of the vehicle and comprises a mounting member 3 which is adapted to accommodate vehicle components, namely a bumper unit 4, a cooling module 5 and a not shown headlight (FIG. 1).

The mounting member 3 has a number of sections extending in different directions for accommodation of the components such as a transversal section 6 (crossbrace) substantially extending in horizontal direction and two spaced-apart vertical sections 7 7' (vertical braces). The vertical braces 7, 7' are each integrally connected to the transversal section 6 and protrude vertically downward from an underside of said transversal section. If so deemed necessary, the vertical sections 7, 7' may be interconnected in a lower-end region via a connecting section which extends parallel to the transversal section 6.

Figure 2:
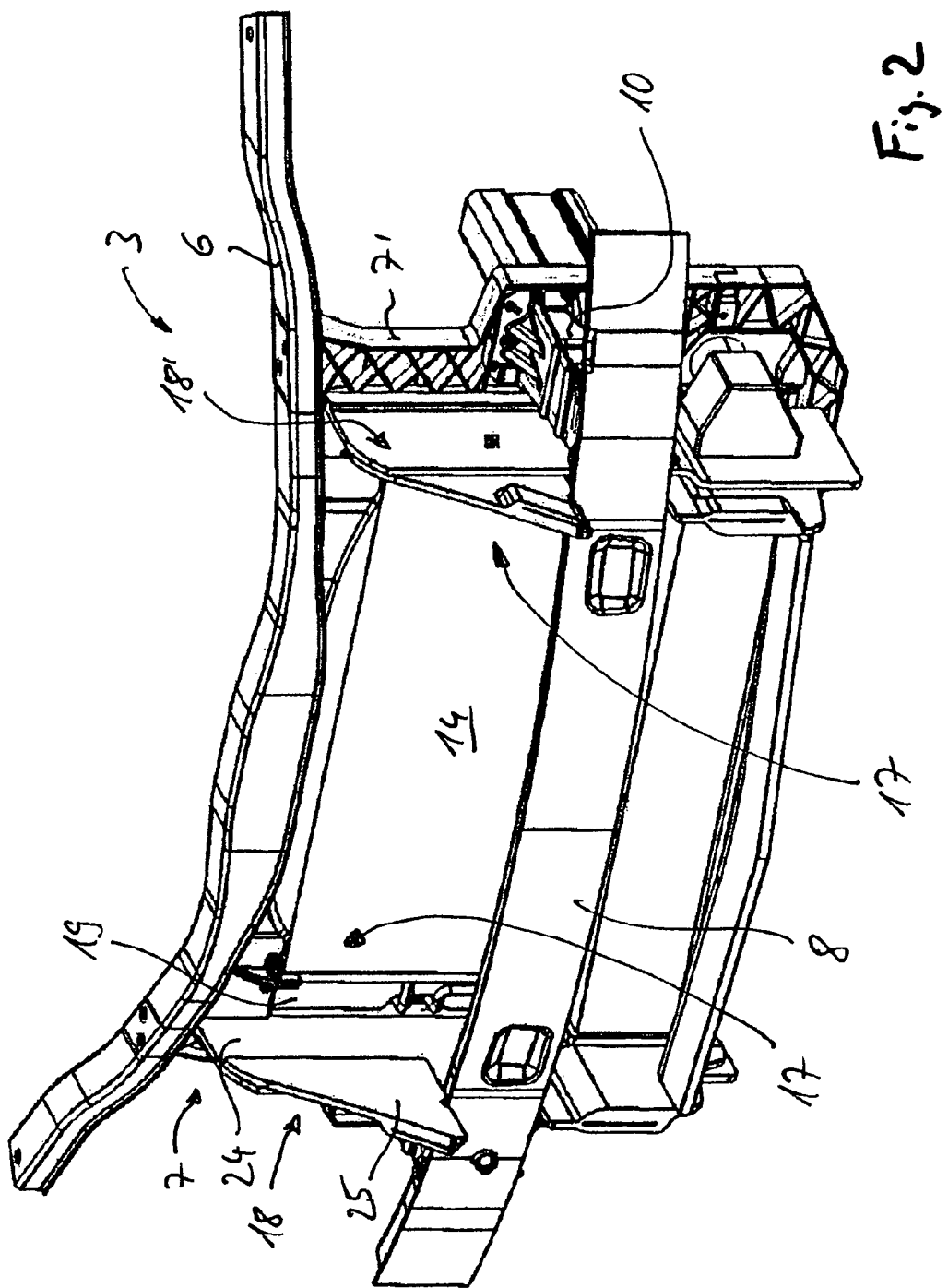
FIG. 2 is a perspective front view of the front-end module in FIG. 1 in which the cover of a bumper unit is omitted.

As will be seen particularly from FIG. 5 the bumper unit 4 substantially comprises a transversal bumper bracket 8 and a bumper cover 9. The bumper cover 9 extends cross to the vehicle direction of travel F and is spaced from a lower region of the mounting member 3. As shown in FIG. 2 the bumper bracket 8 of the bumper unit 4 is secured to the vertical sections 7, 7' by means of a fixing brace 10. The bumper cover 9 has air inlets arranged in a lower region thereof which permits fresh air to flow from the vehicle ambience toward the cooling module 5 against the travel direction F (X direction). A recess 12 is provided above the bumper unit 4 to accommodate a not shown radiator grille such that other than in case of the air inlets 11 it is possible for fresh air to flow from the ambience to the cooling module 5 in an upper region of the bumper unit 4.

The cooling module 5 comprises a number of heat exchangers in the form of a plate type water cooler 13 and a plate type condenser 14 in travel direction F disposed in front of said latter which are both positioned in a central area of the mounting member 3 between the transversal section 6 and a bottom stone guard 15 of the vehicle front end. Behind the water cooler 14 as viewed in vehicle travel direction F there is a fan 20 fitted the usual way. An intercooler 16 is arranged in a lower region in front of the condenser 14 as viewed in travel direction F. These heat exchangers of the cooling module are secured to the mounting member 3 with the aid of suitable fixing means.

An air guide unit 17 serves to carry air from the air inlets 11 of the bumper unit 4 and the radiator grille toward the cooling module 5. Said air guide unit 17 is also to provide an ambience seal for the cooling module 5 against adjacent components, particularly the mounting member 3. A seal is established this way between the engine compartment which is in travel direction disposed behind the cooling module 5 and which carries relatively warm air, and the space in front of the cooling module 5 as viewed in travel direction F in which fresh air impinges the cooling module 5.

The air guide unit 17 comprises a plurality of air guide elements made of a foamed material. These air guide elements preferably consist of foamed plastic which is a flexible material. This foamed plastic of the air guide elements may for instance be an EPP or a PU plastic material. The air guide elements are preferably in the form of air baffles permitting to be disposed between two spaced apart components in the front end of the vehicle.

The air guide unit 17 comprises two lateral air guide elements 18, 18' each extending between the vertical sections 7 and/or 7' of the mounting member and a front-end body shell, especially the bumper cover 9. The air guide elements 18, 18' each extend in vertical direction (Z direction) and form a connecting wall between a vertical marginal area 19 of the cooling module 5 and the front-end body shell of the vehicle. In particular, the air guide elements 18, 18' extend over the full height (Z direction) of the cooling module 5 as may be seen from FIG. 1 in conjunction with FIG. 5. FIG. 5 shows that a forward narrow side 21 of the air guide element 18, 18' is provided with a recess 22 in the area of the bumper bracket 8 and that a lower extension 23 of the air guide element 18, 18' extends right into a lower end region of the air inlets 11.

As may be better seen from FIG. 4 the air guide element 18, 18' is segmented into a rear air guide segment 24 and a forward air guide segment 25. A rear narrow side 26 of the rear air guide segment 24 is positively connected to the mounting member 3 by means of a tongue-and-groove joint while a forward narrow side 21 of the forward air guide segment 25 is positively connected to the bumper cover 9 via tongue-and-groove joint as well. The point of connection for attachment of the forward air guide segment 25 to the bumper cover 9 may be located in a fixing area 27 above the transversal bracket 8. Preferably the rear air guide segment 24 is positively joined with the mounting member 3 over the full length of the rear narrow side 26 to thereby provide a reliable connection. After mounting of the air guide element 18, 18', free end areas of the rear air guide segment 24 and the forward air guide segment 25 are mating with longitudinal sides 28, 28' to thereby safely define an air guide channel K between the front-end vehicle body shell and the cooling module 5. The length of the rear and the forward air guide segments 24, 25 in X-direction should be selected larger than the distance between the front-end body shell and the cooling module 5 by an amount ensuring that the rear air guide segment 24 and the forward air guide segment 25 are overlapping. The rigidity of the air guide segments 24, 25 is such that any undesired bending by the fresh air stream is prevented.

An air guide unit 17 of an alternative embodiment shown in FIG. 8 may have a lateral air guide element 30 that is integral with the unit such that a rear narrow side 31 of said air guide element is positively connected to the mounting member 3 (same as the rear air guide element 24) and a forward narrow side 32 abuts an inner face of the front-end shell of the vehicle (bumper cover 9). The rigidity of that lateral air guide element 30 will be selected such that any undesired bending and/or buckling thereof is prevented. Advantageously, the lateral air guide element 30 may be pre-assembled on the front end module 1. The flexibility of the lateral air guide element 30 permits that dimension and shape deviations of the front-end shell of the vehicle relative to the mounting member 3 may be compensated. This advantageously results in a simplified assembly.

A direct contact with adjoining components may be ensured due to the flexibility of the air guide elements 18, 18', 30 to thereby improve the sealing action. In addition, attachment to adjacent components may be effected simply by plugging, clipping, pressing, clamping, buttoning or large-area slip-on in a "christmastree" pattern.

Figure 3:
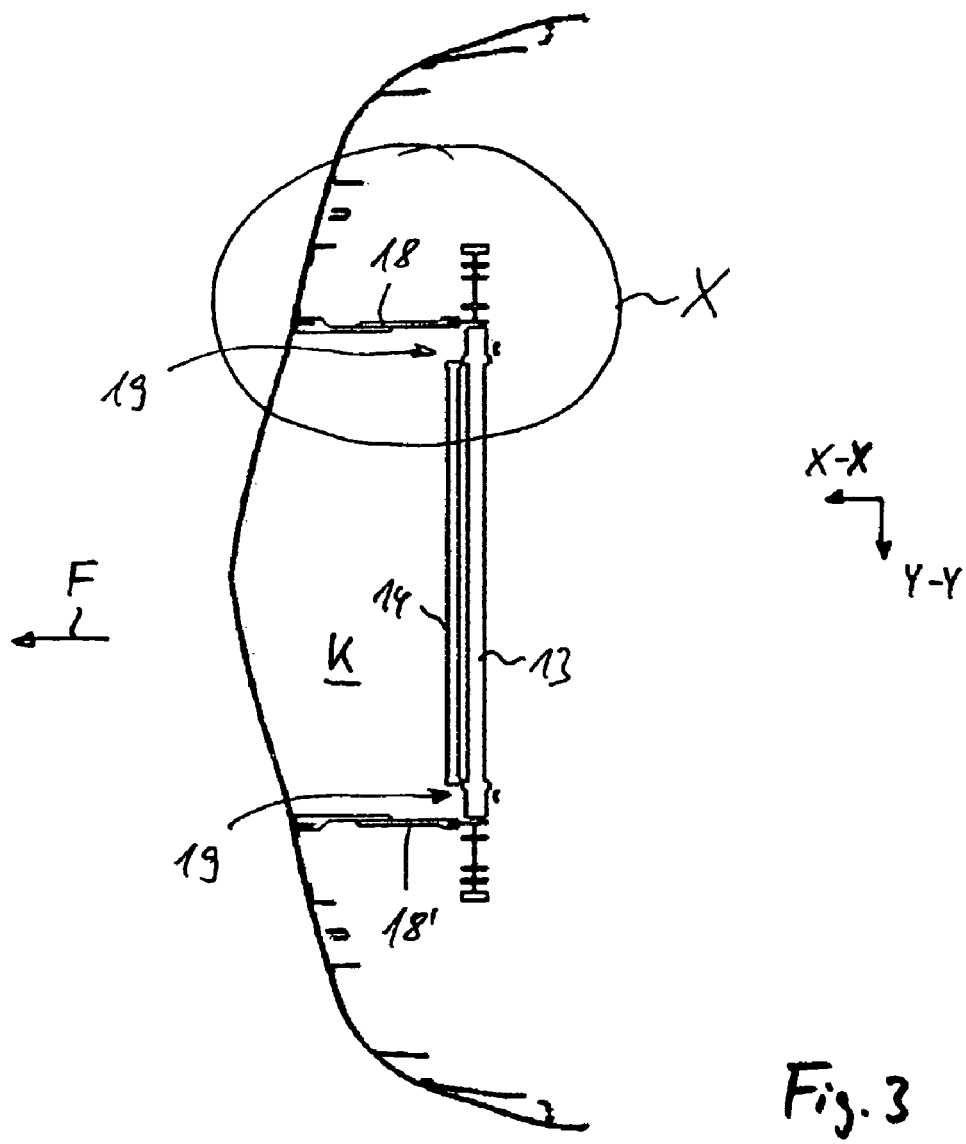
FIG. 3 is a horizontal section through the front-end module that shows lateral air guide elements of an air guide unit which extend from the marginal ends of the cooling module between the mounting member and the bumper cover in a first embodiment.

As will be seen from FIG. 8 a crashbox 33 for the pürotection of pedestrians may be arranged on the side of the lateral air guide element 30 that is facing away from the cooling module 5 and secured to a front face of the mounting member 3. A longitudinal member 2 of the body shell at back of said crashbox 33 is fixed to the mounting beam 3. Crashbox 33 and longitudinal member 2 are not shown in FIG. 3 and FIG. 4 for clarity reasons.

As may be seen particularly from FIG. 6 and FIG. 7 the air guide unit 17 comprises an inclined air guide element 38 which serves for sealing the cooling module 5 against the mounting member 3. To this end said air guide element 38 is sloped under an angle of about 45⁰ between the transversal section 6 of the mounting member 3 and the top 39 of a condenser 14. The inclination angle of the air guide element is dependent on the position of the condenser 14 relative to the transversal section 6 of the mounting beam 3. The air guide element 38 may also be arranged vertically. It serves to provide sealing in an area above the cooling module 5. Attachment of the inclined air guide element 38 to the transversal section 6 is effected within the area of a striker 40 for securing a not shown engine cover to said section 6. For this purpose there is a metallic channel 41 fixed to the mounting member 3 with its apex contacting the transversal section 6. Within a fixing area B on the side facing the transversal section 6 of the mounting member 3 the inclined air guide element 38 is provided with a through hole 42 for a fixing mandrel 43 on the free end of a leg of the channel 41 to be positively engaged in. A lower narrow side 44 of the air guide element 38 on the end facing away from the mounting member 3 is seated on an upper narrow side 39 of the condenser 14. Advantageously, the air guide element 38 may be pre-assembled on the mounting member 3 such that adaptation to the contours of the condenser 14 of the cooling module 5 may be ensured due to the compressibility of said element 38.

The air guide elements 18, 18', 30, 38 of the air guide unit 17 are preferably made of just one foamed material though these elements may also be formed of two material components alternatively, for instance a first foamed material for the core and a second foamed material for the skin. Also, the skin may alternatively be in the form of a protective sheet to satisfy given mechanical and/or thermal requirements on air guiding with integrated ambience sealing. It is an advantage that in case of direct contact thereof with adjacent components a higher surface temperature will be acceptable.

The invention claimed is:

1. A front-end module for vehicles which comprises a mounting member containing a plurality of sections extending in different directions to accommodate vehicle components, wherein a component provided as a cooling module is, by means of fixing elements secured to said mounting member in a central area thereof; and wherein an air guide unit is disposed adjacent to said mounting member, said air guide unit being provided with at least one lateral, flexible air guide element made of a foamed flexible material, wherein the lateral, flexible air guide element is segmented, such that a rear air guide segment of the air guide element is positively connected to the mounting member and a forward air guide segment of the air guide element is positively connected to a cover of the bumper unit, and wherein the rear air guide segment and the forward air guide segment overlap with each other in opposing longitudinal sides in a facing and mating relationship, to form a tight air channel wall, whereby the rigidity of the air guide segments is such that any undesired bending by a fresh air stream is prevented.

2. The front-end module according to claim 1, wherein a plurality of flexible air guide elements are arranged to form an air guide channel between front-end air inlets and a cooling module disposed at the rear thereof, as viewed in the vehicle travel direction.

3. The front-end module according to claim 1, wherein the air guide unit includes a plurality of flexible air guide elements which are arranged to surround the cooling module like a frame and which are each positively connected to the mounting member.

4. The front-end module according to claim 1, wherein the at least one lateral, flexible air guide element extends between an extension plane of the mounting member and/or the cooling module on the one hand and a vehicle body shell arranged in front thereof as viewed in the travel direction on the other hand, at least in the area of a vertical margin of the cooling module.

5. The front-end module according to claim 1, wherein the air guide unit comprises an air guide element which extends between a transversal section of the mounting member and the top of a heat exchanger of the cooling module.

6. The front-end module according to claim 1, wherein the air guide element is in the form of a baffle.

7. The front-end module according to claim 1, wherein the foamed, flexible material is an EPP or PU plastic.

8. The front-end module according to claim 1, wherein the foamed, flexible air guide element is sheathed with a protective sheet.

9. The front-end module according to claim 1, wherein the foamed, flexible material is a plastic material.

10. The front-end module according to claim 4, wherein the at least one lateral, flexible air guide element extends in a vertical direction and is, by its rear narrow side, positively connected to the mounting member on the one hand and by its forward narrow side positively joined with or abutted against the cover of the bumper unit on the other hand.

11. The front-end module according to claim 4, wherein the lateral, flexible air guide element is connected to the bumper cover and/or to the mounting member by tongue and groove.

12. The front-end module according to claim 10, wherein the forward narrow side of the at least one lateral, flexible air guide element is adapted to the vertical contour of the bumper unit and that said lateral air guide element is provided with a recess in the area of a bracket of the bumper unit.

13. The front-end module according to claim 12, wherein the lateral, flexible air guide element is a one-piece member.

14. The front-end module according to claim 5, wherein, on a side facing the transversal section of the mounting member, the air guide element is provided with a through hole in which a fixing mandrel protruding from the transversal section of the mounting member is positively held.

15. The front-end module according to claim 5, wherein, on a side facing away from the transversal section of the mounting member, the air guide element abuts the surface of the upper narrow side of the heat exchanger of the cooling module by its lower narrow side.

16. A front-end module for vehicles which comprises:
a mounting member containing a plurality of sections extending in different directions to accommodate vehicle components, wherein a component provided as a cooling module is, by means of fixing elements, secured to said mounting member in a central area thereof; and
an air guide unit disposed adjacent to said mounting member, said air guide unit being provided with at least one air guide element made of a flexible material, said air guide element extending between a transversal section of the mounting member and the top of a heat exchanger of the cooling module,
wherein, on a side facing the transversal section of the mounting member, the air guide element is provided with a through hole in which a fixing mandrel protruding from the transversal section of the mounting member is positively held.

17. A front-end module for vehicles which comprises:
a mounting member containing a plurality of sections extending in different directions to accommodate vehicle components, wherein a component provided as a cooling module is, by means of fixing elements, secured to said mounting member in a central area thereof; and
an air guide unit disposed adjacent to said mounting member, said air guide unit being provided with at least one air guide element made of a flexible material, said air guide element extending between a transversal section of the mounting member and the top of a heat exchanger of the cooling module,
wherein, on a side facing away from the transversal section of the mounting member, the air guide element abuts the surface of the upper narrow side of the heat exchanger of the cooling module by its lower, narrow side.

* * * * *